Sept. 25, 1956 E. E. FOSTER 2,764,259
SPRING MOTOR
Filed Feb. 14, 1955 2 Sheets-Sheet 1
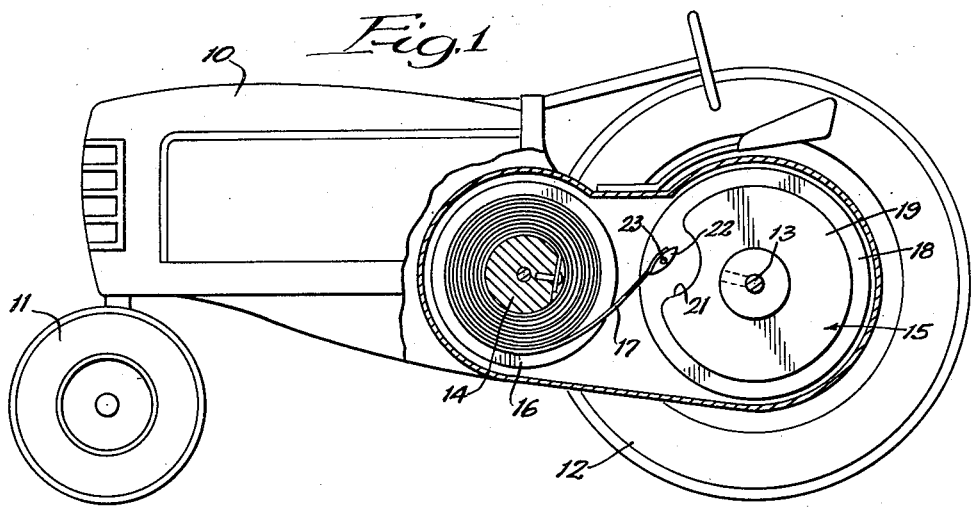
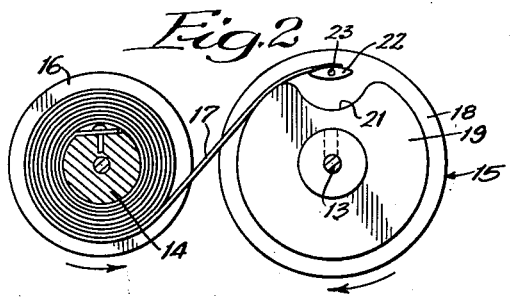
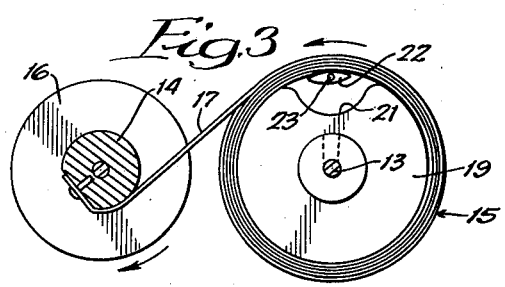
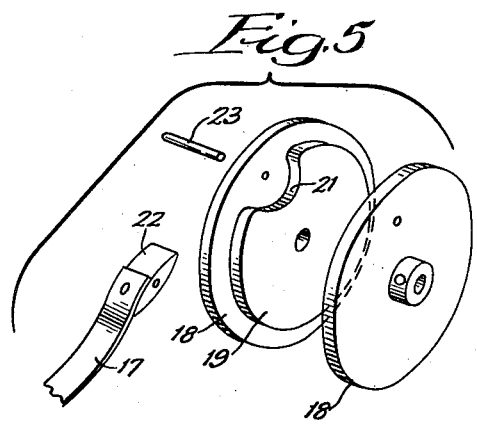
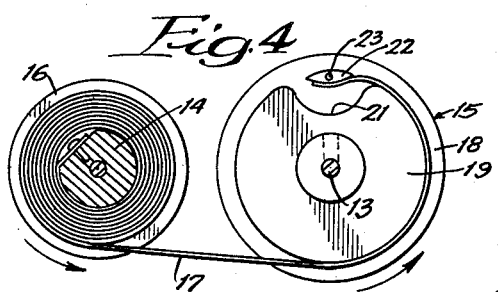
INVENTOR:
Edwin E. Foster,
BY
Bair, Freeman & McKinney
ATTORNEYS.

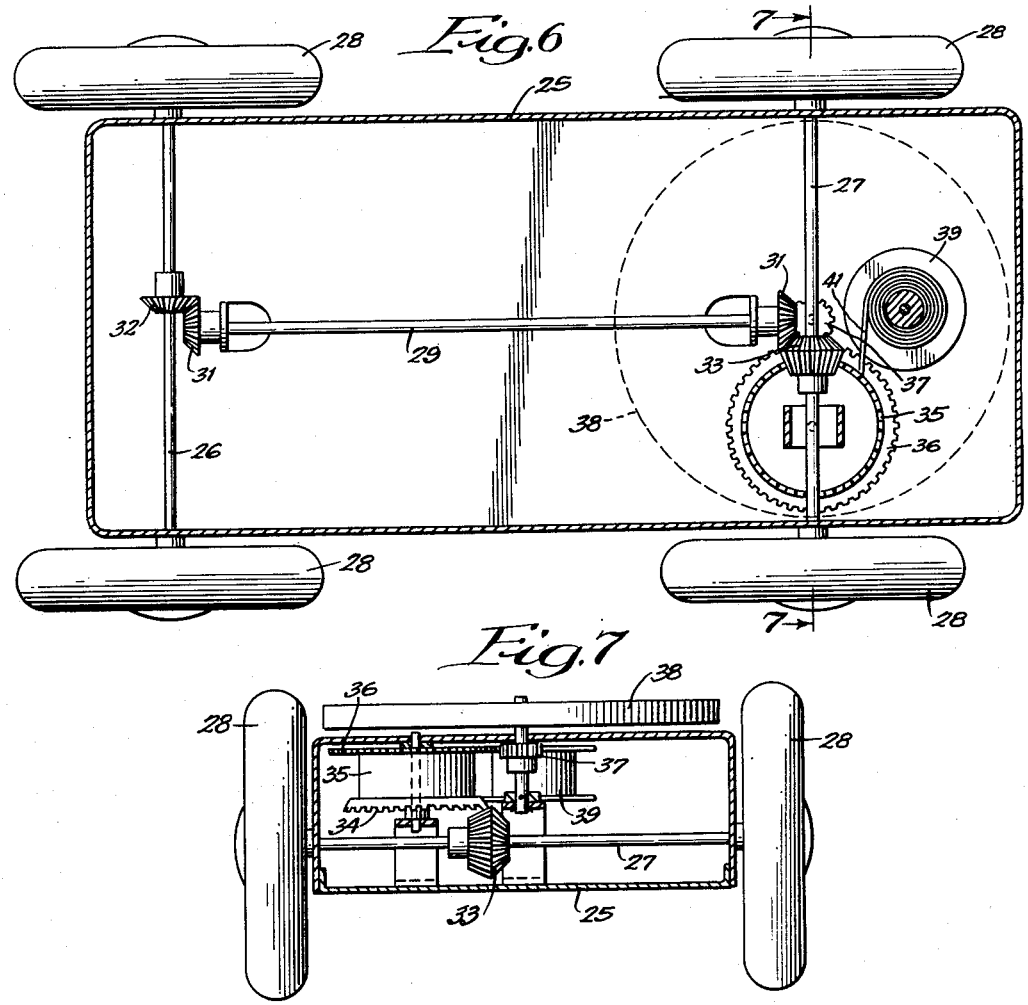

United States Patent Office 2,764,259
Patented Sept. 25, 1956

2,764,259

SPRING MOTOR

Edwin E. Foster, Austin, Tex., assignor to Majik-Ironers, Inc., Austin, Tex., a corporation of Texas Application February 14, 1955, Serial No. 487,900

7 Claims. (Cl. 185—37)

This invention relates to a spring motor and more particularly to a motor for use with wheeled vehicles and the like having a relatively large inertia.

Spring motors as heretofore used by vehicles have commonly been wind-up motors in which the spring is wound with a key and drives the wheel through gearing. Such mechanism is relatively expensive since it requires a ratchet and gearing and is further very difficult for small children to wind.

Spring motors and inertia motors have also been used which are wound by pushing the vehicle, but these are also difficult for small children to use. Furthermore, all types of motors, as heretofore used leave the vehicle at a subtsantial distance from its starting position so that it must be retrieved for a subsequent operation.

It is one of the objects of the present invention to provide a spring motor which is extremely easy to energize and which operates through a plurality of cycles of decreasing amplitude in opposite directions.

According to one feature of the invention, the spring provides a substantially constant force regardless of the degree of winding and exerts a slightly greater force in one direction than in the other.

Another object of the invention is to provide a spring motor in which the motor is connected to a relatively high inertia load, such as a vehicle or a flywheel which will function to rewind the motor partially in the opposite direction after unwinding of the motor in one direction.

A further object is to provide a spring motor in which the spring effect is provided by a laterally flexible strip biased to wind itself on a relatively small drum and adapted to be wound in either direction on a larger drum.

Under one feature of the invention, one end of the spring is connected to the larger drum through a pivoted block shape to provide a substantially continuous smooth surface for the drum regardless of the direction of winding of the spring thereon.

The above and other objects and features of the invention will be more readily apparent when read in connection with the accompanying drawings, in which:

Figure 1 is a side elevation with parts broken away and in section of a wheeled vehicle equipped with a spring motor embodying the invention;

Figures 2, 3 and 4 are side views partly in section showing the spring motor in different degrees of winding;

Figure 5 is a partial disassembled view of the larger drum forming a part of the spring motor;

Figure 6 is a top sectional view of an alternative vehicle construction equipped with a motor embodying the invention; and Figure 7 is a section on the line 7—7 of Figure 6.

As illustrated in Figures 1 to 5, the invention may be applied to a wheeled vehicle having a frame, indicated generally at 10, supported on front idler wheels 11 and on rear driving wheels 12. The driving wheels 12 are secured to an axle 13 extending across the vehicle and having the wheels secured to the opposite ends thereof.

In accordance with the present invention, the driving wheels 12 are connected to a spring motor of the type which may be wound by pushing the vehicle over the floor in one direction and which will then function to drive the vehicle alternately in opposite directions through decreasing distances until the vehicle finally comes to rest substantially at its starting position. The spring motor for this purpose, as shown, comprises a relatively small diameter drum 14 mounted for free rotation on the vehicle parallel to and spaced from the axle 13 and a larger diameter drum 15 mounted on the axle 13. The small diameter drum may be made up of a solid hub, as shown, with side flanges or discs 16 between which the spring strip 17 may fit. The large drum 15 may be formed of a pair of discs 18 each having on its inner face a projecting hub portion 19 cut away at one point, as indicated at 21, to define a peripheral recess. The two discs 18 may be assembled on the axle face-to-face with the projecting portions 19 abutting and the recesses 21 in registry with each other. In the assembled position, the discs 18 define flanges between which the spring strip 17 may fit to engage a relatively large hub defined by the projections 19.

One end of the spring strip 17 is permanently secured to the hub 14 as by a screw or similar fastening shown and the opposite end is adapted to be connected to the disc 15 to be wound thereon in either direction. For this purpose, the end of the strip is secured to a block 22 whose opposite sides are arcuately curved on the same radius as the hub portion 19. The block 22 is centrally pivoted in the recess 21 by means of a pin 23 so that it can swing between two different positions in which its opposite sides face outwardly in the recess and form in effect smooth continuations of the outer surface of the hub portion 19. In this way, the spring can be wound in either direction on the large drum 15 smoothly without any kinking.

The spring strip 17 is normally biased to wind itself relatively tightly on the small drum 14 so that in the normal or at rest position, the parts will occupy the position shown in Figure 1. In this condition, the spring strip is coiled entirely on the small drum 14 with none of the spring being wound on the larger drum 15.

For winding the spring the vehicle is moved backward causing the larger drum to turn clockwise so that the spring will be wound thereon in the manner shown in Figure 2. In this wound condition, the spring is wound on the larger drum contrary to its normal curvature and is unwound from the smaller drum contrary to its bias. The spring therefore tends to unwind from the larger drum 15 and to rewind on the smaller drum 14 with a relatively large spring force. It will be noted, however, that since the active part of the spring is always that part between its points of tangency to the two drums, the spring force will be substantially constant regardless of the extent of winding.

When the vehicle is released, it will tend to move forward with the larger drum 15 turning counterclockwise, as shown in Figure 3, and the smaller drum turning clockwise. This operation will continue until the spring strip is completely unwound from the large drum and rewound on the smaller drum, with the parts shown in the position of Figure 1. However, since the vehicle is moving at a relatively high rate at this time, the inertia of the parts will continue the movement in the same direction so that the spring will be again unwound from the small drum 14 and rewound on the large drum 15 in the direction shown in Figure 4. In this direction of winding a lesser degree of winding force is required since the spring is wound on the larger drum 15 in the same direction in which it is normally biased. This operation will continue until the inertia is dissipated at which time the spring will be partially wound on the larger drum 15. When the vehicle comes to a stop, the parts will again reverse due to the tendency of the spring to rewind itself on the small drum 14 so that the vehicle will again be driven in a reverse direction. After completion of unwinding of the spring from the wound condition, as shown in Figure 4, inertia will carry the parts back in the direction indicated in Figure 2 to partially rewind the spring in the original direction. This operation will continue in cycles of decreasing amplitude until the parts finally come to rest in the original position shown in Figure 1. If the vehicle wheels are straight, it will be apparent that the vehicle will finally come to rest in its original starting position so that it does not need to be retrieved.

Figures 6 and 7 illustrate an alternative construction wherein the vehicle is provided with a four-wheel drive and wherein an additional inertia member is provided to form a part of the spring motor. As shown, the vehicle comprises a rectangular box frame 25 through which front axle 26 and rear axle 27 extend to carry the wheels 28. The axles are connected through bevel gearing, including a longitudinal shaft 29 carrying bevel pinions 31 at its opposite ends which mesh with bevel pinions 32 on the front axle and double bevel pinion 33 on the rear axle. The opposite side of double bevel pinion 33 meshes with a gear 34 carried by a relatively large drum 35 forming a part of the spring motor. The drum 35 carries the bevel gear 34 at one of its flanges and has its opposite flange formed as a large gear 36 driving a small pinion 37 which is secured to a relatively large flywheel 38 lying above the box frame 25.

The spring motor is completed by a small drum 39 parallel to and spaced from the drum 35 and a spring strip 41 secured at its opposite ends to the respective drums and normally biased to wind itself on the drum 39 in the same manner as the spring strip 17 of Figures 1 to 5.

The mechanism of Figures 6 and 7 functions in substantially the same manner as that of Figures 1 to 5, except that the weight and inertia of the vehicle itself is not relied on. In this construction, the motor may be initially wound by moving the vehicle backwards to wind the spring strip from the small drum to the larger drum, as shown in Figures 2 and 3. When the vehicle is released to be driven forward, the flywheel 38 will be turned at high speed to develop a large inertia force which will be effective to rewind the spring in the manner shown in Figure 4. Upon completion of the next cycle, the inertia of the flywheel 38 will be effective to rewind the spring in the opposite direction, as shown in Figure 2, so that the motor will continue to operate in a series of decreasing cycles in opposite directions.

While the invention has been specifically illustrated and described in connection with wheeled vehicles, it will be understood that the motor may be used in various other environments. It is therefore not intended that the scope of the invention be limited to the embodiments shown nor otherwise than by the terms of the appended claims.

What is claimed:

1. A spring motor comprising a pair of drums of different diameters mounted for rotation on spaced parallel axes, a resilient spring strip secured at one end to the drum of smaller diameter and pivotally secured at its other end to the drum of larger diameter, the spring strip being biased to wind onto the drum of smaller diameter and tending to rewind itself on the drum of smaller diameter when it is unwound therefrom and wound in either direction on the drum of larger diameter and a load having a relatively large inertia compared to the spring strength connected to the drum of larger diameter.

2. A spring motor comprising a pair of drums of different diameters mounted for rotation on spaced parallel axes, a resilient spring strip secured at one end to the drum of smaller diameter, the larger drum having a recess in its periphery, a block centrally pivoted in the recess and arcuately curved on its opposite sides to form a substantially smooth continuation of the drum surface when turned in either direction, the other end of the spring strip being secured to the block to turn it in one direction when the strip is wound one way on the drum and in the other direction when the strip is wound the other way on the drum, the spring strip being initially biased to tend to wind itself on the smaller drum.

3. A spring motor comprising a pair of drums of different diameters mounted for rotation on spaced parallel axes, a resilient spring strip secured at one end to the drum of smaller diameter, the larger drum having a recess in its periphery, a block centrally pivoted in the recess and arcuately curved on its opposite sides to form a substantially smooth continuation of the drum surface when turned in either direction, the other end of the spring strip being secured to the block to turn it in one direction when the strip is wound one way on the drum and in the other direction when the strip is wound the other way on the drum, the spring strip being initially biased to tend to wind itself on the smaller drum and a load having an inertia which is large relative to the strength of the spring connected to the larger drum.

4. The construction of claim 1 in which the load comprises a rotatable flywheel drivably connected to the larger drum.

5. A spring motor in combination with a vehicle movably supported on wheels comprising a pair of drums of different diameters rotatably mounted on spaced parallel axes on the vehicle, a spring strip secured at one end to the smaller drum and normally biased to tend to wind itself on the smaller drum, means pivotally connecting the other end of the spring strip to the larger drum to wind in either direction thereon, and means drivably connecting the larger drum to a wheel on the vehicle.

6. A spring motor in combination with a vehicle movably supported on wheels comprising a pair of drums of different diameters rotatably mounted on spaced parallel axes on the vehicle, a spring strip secured at one end to the smaller drum and normally biased to tend to wind itself on the smaller drum, means pivotally connecting the other end of the spring strip to the larger drum to wind in either direction thereon, a flywheel rotatably mounted on the vehicle, and reducing gearing means connecting the larger drum to the flywheel and to a wheel of the vehicle.

7. The construction of claim 5 in which the larger drum is mounted on and secured to an axle on which a wheel of the vehicle is mounted.

References Cited in the file of this patent

UNITED STATES PATENTS

| 2,063,799 | Fornelius | Dec. 8, 1936 |
| 2,622,700 | Geyer | Dec. 23, 1952 |

FOREIGN PATENTS

| 232,211 | Switzerland | May 15, 1944 |